Aug. 18, 1964
F. BERGANDI ETAL
3,144,887
SHAFT POSITIONING DEVICE
Filed April 30, 1962
2 Sheets-Sheet 1
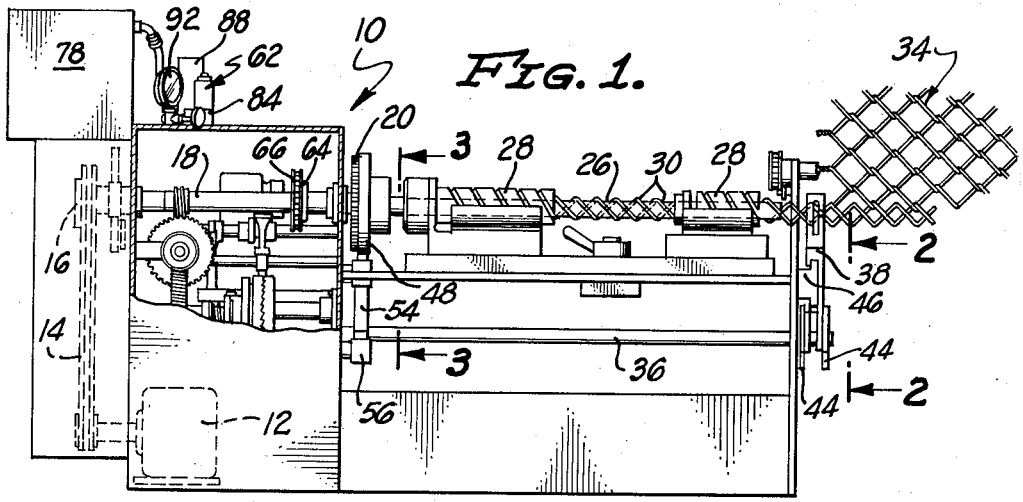
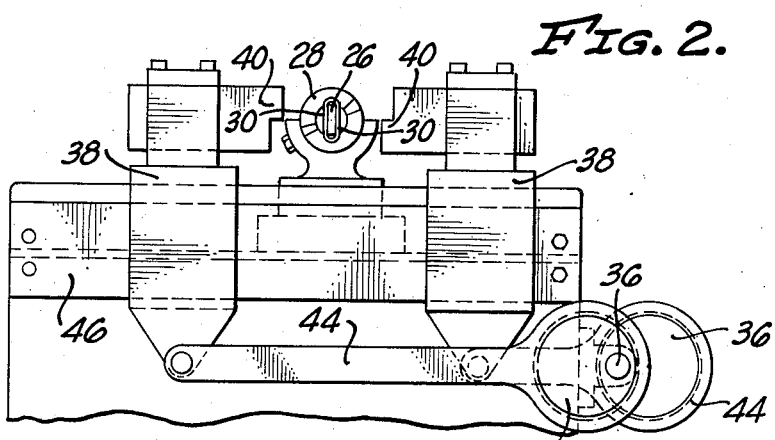
INVENTORS
FRANK BERGANDI
HERBERT E. ROHRBACHER
BY O'BRIAN & BLACKHAM
ATTORNEYS

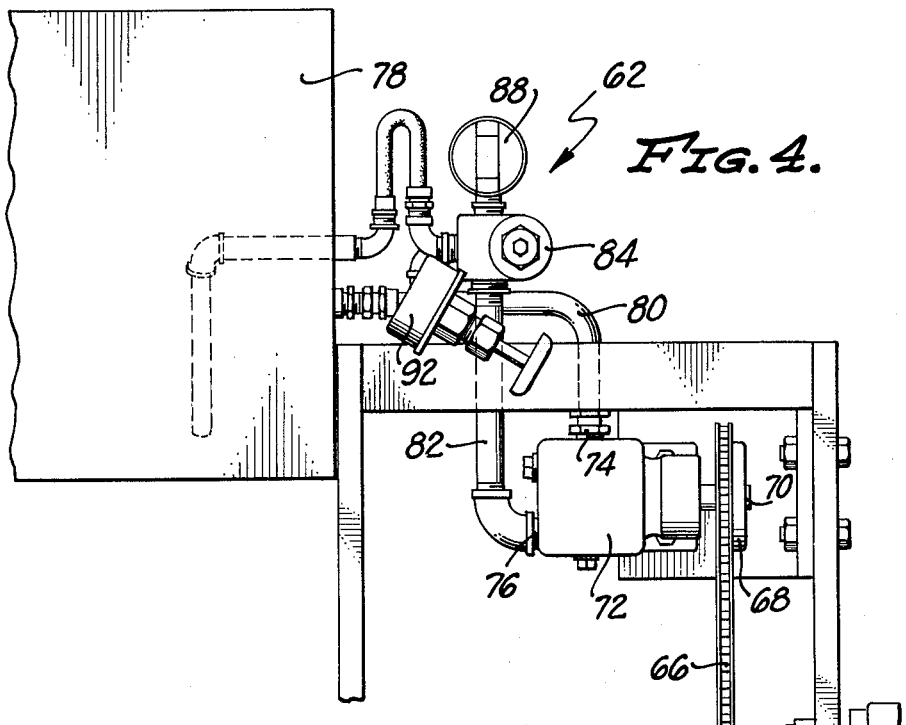
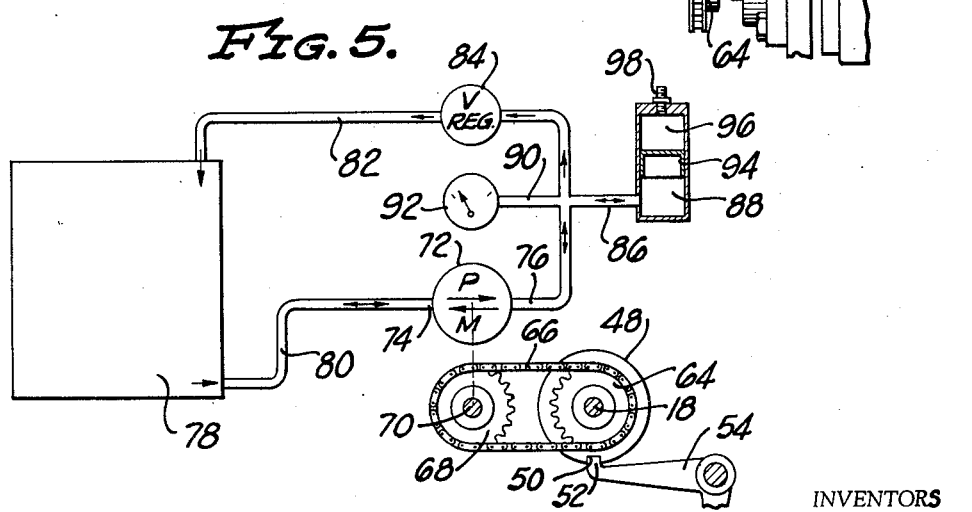
INVENTORS
FRANK BERGANDI,
HERBERT E. ROHRBACHER
BY
O'BRIAN & BLACKHAM
ATTORNEYS United States Patent Office 3,144,887
Patented Aug. 18, 1964

3,144,887
SHAFT POSITIONING DEVICE
Frank Bergandi, El Monte, and Herbert E. Rohrbacher, Whittier, Calif., assignors to Bergandi Manufacturing Company, Inc., El Monte, Calif., a corporation of California
Filed Apr. 30, 1962, Ser. No. 191,071
6 Claims. (Cl. 140—92.6)

This invention relates to a new and improved shaft positioning device. More specifically it relates to a device which is designed so as to rotate a shaft a limited amount after the normal rotation of the shaft has been stopped so as to locate the shaft in a desired position.

Devices of this category are needed in various different types of machines because of various problems encountered with each of these types of machines. In general, they are needed wherever the mechanism serving to stop the rotation of a shaft is constructed in such a manner that the shaft is not precisely indexed when it comes to rest because of the inertia of the shaft and/or various parts connected to it or because of the action of various materials processed within the machine.

As an example of these factors reference is made to the Bergandi U.S. Patent No. 2,625,961 issued January 20, 1953. This patent pertains to a machine for weaving wire netting which employs a rotatable shaft carrying a mandrel. During the operation of this machine the rotation of the shaft is periodically stopped so as to permit wire to be cut. For the machine to operate satisfactorily the shaft must be positioned in exactly a predetermined position during these cutting operations. The spring-like characteristics of certain types of wire as well as the inertia of certain parts of the machine will tend to prevent the shaft referred to in the preceding patent from consistently stopping in this predetermined position. As a consequence of this under certain circumstances, difficulties are encountered in the operation of the structure shown in this patent.

An object of the present invention is to provide a shaft positioning device for use with machines of the category set forth in the aforesaid U.S. Patent No. 2,625,961 so as to eliminate problems in the operation of these machines as are briefly indicated in the preceding paragraph. A more general object of the present invention is to provide devices for use in rotating a shaft a limited amount after the normal rotation of the shaft has been stopped in order to locate the shaft in a predetermined position. Another object of this invention is to provide shaft positioning devices as herein described which may be easily manufactured at a comparatively nominal cost, which may be easily installed on either new or used equipment, and which will perform reliably for prolonged periods without attention or significant maintenance.

These and various other objects of this invention as well as various specific advantages of it will be apparent from a detailed consideration of the remainder of this specification, the appended claims and the accompanying drawings, in which:

FIG. 1 is a side elevational view of a Wire Netting Machine as set forth in the Bergandi U.S. Patent No. 2,625,961 equipped with a shaft positioning device of this invention, a part of the housing of this machine being broken away so as to show part of the internal mechanism within this machine;

FIG. 2 is a partial cross-sectional view taken at line 2—2 of FIG. 1;

FIG. 3 is a partial cross-sectional view taken at line 3—3 of FIG. 1;

FIG. 4 is a fragmentary top view of the machine shown in FIG. 1 showing the use of the shaft positioning device of this invention with this machine; and FIG. 5 is a schematic view illustrating the operation of this shaft positioning device with this machine.

The accompanying drawings are primarily intended so as to clearly illustrate a presently preferred embodiment or form of a shaft positioning device of this invention and its operation. From a careful consideration of the remainder of this specification in conjunction with these drawings those skilled in the art of machine design will realize that the inventive features or principles embodied within the particular device illustrated can be embodied within differently appearing devices through the use of routine engineering skill or ability.

As an aid to understanding this invention it can be stated in essentially summary form that it concerns shaft positioning devices, each of which includes a pump and a connected shaft, the movement of which is controlled through the use of the pump. Such control is accomplished through the use of a hydraulic circuit connected to the pump, this hydraulic circuit including means whereby the pump operates so as to store energy within an accumulator during the normal rotation of the shaft and whereby when the shaft is stopped the accumulator supplies fluid to the pump so as to operate it as a motor, rotating the shaft in a desired manner.

The actual nature of this invention is best more fully described by referring directly to the accompanying drawings. As indicated in the preceding brief summary of the drawings, in FIG. 1 there is shown a wire netting machine 10 of the type set forth in the Bergandi U.S. Patent No. 2,625,961 dated January 20, 1953. In the interest of brevity of this specification, various parts of this netting machine which are not necessary to a complete understanding of this present invention are not separately described herein. Such parts are indicated in this patent. In order to complete this disclosure the entire specification and drawings of this patent are incorporated herein by reference.

In the machine 10 an electric motor 12 supplies power through a conventional V-belt drive 14 to a clutch 16 which in turn transmits this power to a shaft 18 which is rotatably mounted in the machine 10. This shaft 18 carries a gear 20 which meshes with a small pinion gear 22 mounted upon a mandrel shaft 24. The shaft 24 is rotatably mounted upon the machine 10 and carries an elongated bar-like mandrel 26 which projects through helical guides 28.

During the use of the machine 10 individual strands of wire 30 are located around the mandrel 26 so as to be formed into a shape for use in a wire netting 34 as the mandrel 26 is rotated. As this mandrel is rotated the various individual strands 30 are caused to move away from the machine 10 so as to be interlaced or woven with respect to the netting 34 so as to increase the size of this netting.

During this weaving operation it is periodically necessary to sever the woven portions of the strands 30 which have been woven into the netting 34 from the remainders of these strands still positioned around the mandrel 26. Whenever it is necessary to cut these strands 30 the rotation of the shaft 18 is stopped as described in the aforenoted Bergandi patent through actuation of the clutch 16; after this happens a small shaft 36 is rotated so as to transmit movement to two different carriages 38 in order to bring cutting tools 40 carried by these carriages 38 toward one another so as to sever the ends of the strands 30 projecting from the mandrel 26. Such motion of the carriages 38 is accomplished through the use of eccentric discs 42 secured to the shaft 36 and crank arms 44 which are carried by these discs 42 and pivotally connected to the carriages 38. The motion of carriages 38 in a desired linear path is accomplished by mounting these carriages upon a guide rail 46.

As indicated in the aforenoted Bergandi patent it has been recognized that it is necessary in order to position the mandrel 26 in a desired position during the cut-off operation when the cutting tools 40 are brought toward one another in order to sever the ends of the strands 30 so that the machine 10 will subsequently operate in a proper manner. In the past such positioning has been in part controlled through the use of a disc 48 attached to the gear 20, this disc 48 having a notch 50 formed in its periphery. This notch is adapted to receive a pawl arm 52 carried by means of a bell-crank lever 54 which is rotatably mounted upon the machine 10 in a position so that it is engaged by a crank arm 56 when a secondary shaft 58 is turned during the operation of the complete machine 10. Normally the bell-crank lever 54 has been biased against the crank arm 56 through the use of a small spring 60, one end of which is connected to the bell-crank lever 54 and the other end of which is connected directly to the machine 10. Within this machine 10 means (not shown) of the type indicated in the aforenoted Bergandi patent are provided in order to turn the crank arm 56 so as to withdraw the pawl 52 from the notch 50 at the end of a cutting operation as described in the preceding patent and so as to permit the spring 60 to position this arm 52 in the notch 50 when the clutch 16 is operated so as to stop rotation of the shaft 18.

In theory in the operation of a mechanism as described in the preceding paragraph whenever the clutch 16 stops shaft 18, the arm 52 will automatically engage the notch 50 so as to, in effect, lock the mandrel 26 in a desired position so that the strands 30 are cut in a desired manner. However, in practice these means have not always been operative for the intended purpose. This is particularly the case when the complete machine 10 is operated with different types of wire than the wire for which it was initially designed to weave into a complete wire netting. The reasons for this mal-operation are considered to pertain to the inherent resiliency of the wire, and the tendency of the individual strands 30 to exercise this resiliency in order to turn the mandrel shaft 24 and connected parts in such a manner that the arm 52 does not automatically fit within the notch 50. The inertia of the various connected rotating parts in the machine 10 is also considered to contribute to this result. These various factors have tended to cause the mandrel 26 to pass a desired stop position.

The present invention concerns a shaft positioning device 62 which is designed so as to rotate the shafts 18 and 24 to a position in which the mandrel 26 is in a desired position for operation of the cutting tools 40 in case various factors should cause the arm 52 to override or not fit within the notch 50 when the clutch 16 is actuated to its disengaged position. This device 62, in effect, includes the shaft 18 and the means previously described whereby power is supplied to it.

It also includes a sprocket 64 which is connected to the shaft 18 and a drive chain 66 leading from this sprocket 64 to another sprocket 68 which is secured to a drive shaft 70 extending from a conventional gear pump 72. This gear pump 72 is mounted upon the machine 10 and includes a normal inlet 74 and a normal outlet 76. The inlet 74 is connected to the bottom region within a reservoir 78 for hydraulic fluid by means of a pipe 80. A further pipe 82 connects the normal outlet 76 to the reservoir 78 through a valve 84. A lateral pipe 86 off of the pipe 82 connects the outlet 76 of the pump 72 to the interior of a conventional hydraulic accumulator 88. Another lateral pipe 90 also connects the outlet of the pump 72 to a conventional pressure gage, 92.

Preferably the valve 84 is of a pressure responsive character capable of being pre-set to a desired pressure value so as to permit flow through it from the pump 72 to the reservoir 78 during the normal operation of the device 62. It will, of course, be recognized that such a pressure responsive valve is a conventional type of check valve which will not permit flow from the reservoir 78 through the pipe 82 toward the outlet 76 of the pump 72. Preferably the accumulator 88 is of a conventional cylinder type having an internal piston 94 which is biased against an air pocket 96 within this accumulator during its operation. A conventional valve plug 98 is preferably mounted on the accumulator 88 for use in varying the air pressure within the air pocket 96.

During the operation of the complete machine 10 the device 62 is also operated through the utilization of the drive chain 66 so as to cause the pump 72 to pump hydraulic fluid (not shown) through the valve 84 back into the reservoir 78. Because of the pressure characteristics of this valve 84, before it will open so as to permit such flow, the pressure within the accumulator 88 must build up to a point which is substantially equal to the pressure at which the valve 84 is set to operate. Such build-up of pressure causes movement of the piston 94, compressing the air within the air pocket 96.

When, during the operation of the machine 10, the clutch 16 is actuated so that the shaft 18 is no longer turned by the motor 12 the accumulator 88 will supply hydraulic fluid to the outlet 76 of the pump 72 so as to operate this pump in reverse as a motor. During this operation the fluid flows back to the reservoir 78 through the pipe 80. As the pump 72 is operated in this manner as a motor the rotation of the shaft 70 of the pump 72 will be transmitted through the drive chain 66 back to the shaft 18, causing rotation of the disc 48 in a direction necessary to position the arm 52 so that it will fit within the notch 50. In this position the mandrel 26 is located in the proper orientation so that the operation of the cutting tools 40 serves to cut off the strands 30 in a desired manner.

With the device 62 constructed as shown it is possible to vary the amount the shaft 18 will be rotated in a direction opposite to its normal direction of rotation when the clutch 16 is operated to its disengaged position by varying the pressure at which the valve 84 will open and by varying the operating characteristics of the accumulator 88. This latter is, of course, accomplished by varying the pressure of the air within the air pocket 96. As a consequence of this permissible variation the device 62 may be readily constructed so as to achieve virtually any necessary or desired amount of "extra" rotation caused by this device as it is operated.

Although the device 62 is described in the preceding description in connection with the complete machine 10, it is considered that devices such as the device 62 can be used in many different types of machines where it is desired to rotate a shaft a comparatively limited amount after normal rotation of the shaft has been stopped as, for example, by no longer supplying power for this purpose in order to position the shaft in a desired manner.

Because of the nature of this invention it is to be considered as being limited solely by the appended claims forming a part of this disclosure.

We claim:
1. In a machine having a rotatable shaft at which work is performed:
   means adjacent such shaft for performing work at said shaft when said shaft is rotating, and additional means adjacent said shaft for performing work at said shaft when said shaft is stationary and positioned in a particular position, drive means connected to selectively drive said shaft, and detent means connected to said shaft for holding said shaft in said particular position when said selective drive means is inoperative to drive said shaft;

shaft positioning means to position said shaft in said predetermined position which includes:

a pump having a normal inlet and a normal outlet and a pump shaft, said pump shaft being normally used so as to operate said pump;

means for connecting said pump shaft to said shaft so that both of said shafts rotate at the same time; and a hydraulic circuit means, said circuit means including a reservoir, an accumulator and a pressure responsive valve, first pipe means connecting said normal inlet to said reservoir so that as said shaft is operated said pump draws fluid from said reservoir and second pipe means connecting said normal outlet to said accumulator and to said reservoir through said valve, said accumulator serving to supply hydraulic fluid to said pump so as to operate said pump as a motor to position said shaft to said particular position.

2. A shaft positioning device as defined in claim 1 wherein said pump is a gear pump.

3. In a machine having a rotatable shaft:

selective drive means for causing rotation of said rotatable shaft, means adjacent said rotatable shaft for forming material when said rotatable shaft is rotating and additional means adjacent said rotatable shaft for acting upon said material when said rotatable shaft is positioned in a predetermined position and said selective drive means is inoperative to drive said rotatable shaft;

means for causing rotation of said rotatable shaft;

a pump having a normal inlet and a normal outlet and a pump shaft, said pump shaft being normally used to operate said pump;

means connecting said rotatable shaft and said pump shaft so that both of said shafts rotate at the same time; and a hydraulic circuit means including a reservoir connected to said normal inlet of said pump, pressure responsive valve means connected between said normal outlet of said pump and said reservoir and an accumulator means connected to said normal outlet of said pump so as to be capable of storing hydraulic fluid under pressure passing from said normal outlet during rotation of said rotatable shaft prior to fluid passing through said pressure responsive valve, said accumulator serving to supply hydraulic fluid to said pump so as to operate said pump as a motor when said selective drive means is ineffective to rotate said rotatable shaft so as to cause rotation of said rotatable shaft to said preselected position.

4. A shaft positioning device as defined in claim 3 wherein said pump is a gear pump.

5. A shaft positioning device as defined in claim 3 wherein said accumulator comprises a hydraulic cylinder, a piston located within said cylinder, one end of said cylinder being connected to said normal outlet and a compressible gas located within the other end of said cylinder.

6. The structure of claim 3 wherein said machine is a wire netting machine.

References Cited in the file of this patent
UNITED STATES PATENTS
2,554,381  Patterson _____ May 22, 1951